(12) United States Patent
Hua et al.

(10) Patent No.: US 11,593,615 B2
(45) Date of Patent: Feb. 28, 2023

(54) IMAGE STYLIZATION BASED ON LEARNING NETWORK

(71) Applicant: MICROSOFT TECHNOLOGY LICENSING, LLC, Redmond, WA (US)

(72) Inventors: Gang Hua, Redmond, WA (US); Lu Yuan, Redmond, WA (US); Jing Liao, Redmond, WA (US); Dongdong Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 929 days.

(21) Appl. No.: 16/469,512

(22) PCT Filed: Dec. 12, 2017

(86) PCT No.: PCT/US2017/065664
§ 371 (c)(1),
(2) Date: Jun. 13, 2019

(87) PCT Pub. No.: WO2018/111786
PCT Pub. Date: Jun. 21, 2018

(65) Prior Publication Data
US 2020/0082249 A1 Mar. 12, 2020

(30) Foreign Application Priority Data

Dec. 16, 2016 (CN) .......................... 201611170887.4

(51) Int. Cl.
*G06T 11/00* (2006.01)
*G06N 3/04* (2023.01)
*G06N 3/08* (2023.01)

(52) U.S. Cl.
CPC ............. *G06N 3/0454* (2013.01); *G06N 3/08* (2013.01); *G06T 11/001* (2013.01)

(58) Field of Classification Search
CPC ....... G06N 3/0454; G06N 3/06; G06T 11/001
See application file for complete search history.

(56) References Cited

U.S. PATENT DOCUMENTS

2009/0109236 A1 4/2009 Xu et al.
2013/0136337 A1 5/2013 Asente et al.
(Continued)

FOREIGN PATENT DOCUMENTS

CN     102957927 A    3/2013
CN     103761295 A    4/2014
(Continued)

OTHER PUBLICATIONS

"Office Action and Search Report Issued in Chinese Patent Application No. 201611170887.4", dated Nov. 25, 2020, 14 Pages.
(Continued)

*Primary Examiner* — Antonio A Caschera

(57) ABSTRACT

Image stylization is based on a learning network. A learning network is trained with a plurality of images and a reference image with a particular texture style. A plurality of different sub-networks of the learning network is trained, respectively. Specifically, one of the sub-networks is trained to extract one or more feature maps from the source image and transform the feature maps with the texture style applied thereon to a target image. Each of the feature maps indicates part of feature information of the source image. Another sub-network is trained to apply a specified texture style to the extracted feature maps, such that the target image generated based on the processed feature maps can embody the specified texture style.

20 Claims, 8 Drawing Sheets

(56) References Cited

U.S. PATENT DOCUMENTS

| | | | | |
|---|---|---|---|---|
| 2018/0082715 | A1* | 3/2018 | Rymkowski | ........... G06V 20/10 |
| 2018/0165798 | A1* | 6/2018 | Lin | ......................... G06N 3/084 |
| 2018/0211401 | A1 | 7/2018 | Lee et al. | |
| 2020/0342570 | A1 | 10/2020 | Yuan et al. | |

FOREIGN PATENT DOCUMENTS

| | | |
|---|---|---|
| CN | 104239855 A | 12/2014 |
| CN | 104299258 A | 1/2015 |
| CN | 104572965 A | 4/2015 |
| CN | 105719327 A | 6/2016 |
| CN | 106600713 A | 4/2017 |
| CN | 106937531 A | 7/2017 |
| EP | 3203412 A1 | 8/2017 |
| KR | 101382595 B1 | 4/2014 |

OTHER PUBLICATIONS

Xingquan, et al., "Design and Implementation of Image Color Style Transfer System for Mobile Phone Applications", In Journal of Information and Communication, Issue 6, Total Issue 162, Jun. 30, 2016, pp. 139-140.

"Office Action Issued in European Patent Application No. 19702156. 1", dated Apr. 13, 2022, 11 Pages.

"Notice of Allowance Issued in Chinese Patent Application No. 201611170887.4", dated Mar. 16, 2022, 4 Pages.

"Second Office Action Issued in Chinese Patent Application No. 201810036211.9" dated Feb. 9, 2021, 13 Pages.

"Non Final Office Action Issued in U.S. Appl. No. 16/955,601", dated Sep. 8, 2021, 11 pages.

"Second Office Action Issued in Chinese Patent Application No. 201611170887.4", dated Jun. 28, 2021, 28 Pages.

Chan, et al., "Show, Divide and Neural: Weighted Style Transfer", https://web.archive.org/web/20161216070323/http://cs231n.stanford.edu/reports2016/208_Report.pdf, Retrieved on: Dec. 16, 2016, 6 pages.

Chen, et al., "Towards Deep Style Transfer: A Content-Aware Perspective", In Proceedings of 27th British Machine Vision Conference, Sep. 19, 2016, pp. 1-11.

Dumoulin, et al., "Supercharging Style Transfer", https://research.googleblog.com/2016/10/supercharging-style-transfer.html, Oct. 26, 2016, 6 Pages.

"Supercharging Style Transfer (googleblog.com)", https://news.ycombinator.com/item?id=12798130, Oct. 26, 2016, 13 Pages.

Yamaguchi, et al., "Region-Based Painting Style Transfer", In Proceeding of SIGGRAPH Asia Technical Briefs, Nov. 2, 2015, 4 Pages.

Wang, et al., "Style Transfer via Image Component Analysis", In Journal of IEEE Transactions on Multimedia, vol. 15, Issue 7, Nov. 2013, pp. 1-8.

Xia, et al., "Every Filter Extracts a Specific Texture in Convolutional Neural Networks", In Journal of Computing Research Repository, Aug. 15, 2016, 5 Pages.

Torres, TJ, "Deep Style: Inferring the Unknown to Predict the Future of Fashion", http://multithreaded.stitchfix.com/blog/2015/09/17/deep-style/, Sep. 17, 2015, 16 Pages.

Yangyang, Xiang, "Computational Media Aesthetics for Media Synthesis", In Doctoral Dissertation of National University of Singapore, Dec. 9, 2016, 220 Pages.

Wei, et al., "Fast Texture Synthesis using Tree-Structured Vector Quantization", In Proceedings of the 27th Annual Conference on Computer Graphics and Interactive Techniques, Jul. 23, 2000, pp. 479-488.

Lee, et al., "Pixel-Based Impressionistic Stylization", In International Journal of Multimedia and Ubiquitous Engineering, vol. 11, No. 1, Dec. 9, 2016, 14 Pages.

Liu, et al., "AutoStyle: Automatic Style Transfer from Image Collections to Users' Images", In Journal of Computer Graphics Forum, vol. 33, No. 4, Jul. 15, 2014, 11 Pages.

Mordvintsev, et al., "Inceptionism: Going Deeper into Neural Networks", https://ai.googleblog.com/2015/06/inceptionism-going-deeper-into-neural.html, Jun. 17, 2015, 6 Pages.

Aly, et al., "Image Up-Sampling Using Total-Variation Regularization With a New Observation Model", In Journal of IEEE Transactions on Image Processing, vol. 14, Issue 10, Oct. 2005, pp. 1647-1659.

Bengio, et al., "Representation Learning: A Review and New Perspectives", In Journal of IEEE Transactions on Pattern Analysis and Machine Intelligence, vol. 35, Issue 8, Aug. 2013, pp. 1-30.

Bengio, et al., "A Neural Probabilistic Language Model", In Journal of Machine Learning Research, Feb. 2003, pp. 1137-1155.

Boykov, et al., "Interactive Graph Cuts for Optimal Boundary & Region Segmentation of Objects in N-D Images", In Proceedings of International Conference on Computer Vision, Jul. 7, 2001, pp. 105-112.

Dumoulin, et al., "A Learned Representation for Artistic Style", In Journal of Computing Research Repository, Oct. 24, 2016, pp. 1-24.

Efros, et al., "Image Quilting for Texture Synthesis and Transfer", In Proceedings of 28th Annual Conference on Computer Graphics and Interactive Techniques, Aug. 12, 2001, pp. 341-346.

Efros, et al., "Texture Synthesis by Non-parametric Sampling", In Proceedings of IEEE International Conference on Computer Vision, Sep. 20, 1999, 6 Pages.

Elad, et al., "Style-Transfer via Texture-Synthesis", In Journal of Computing Research Repository, Sep. 20, 2016, pp. 1-48.

Frigo, et al., "Split and Match: Example-based Adaptive Patch Sampling for Unsupervised Style Transfer", In Proceedings of 26th IEEE Conference on Computer Vision and Pattern Recognition, Jun. 26, 2016, pp. 553-561.

Chen, et al., "StyleBank: An Explicit Representation for Neural Image Style Transfer", In Proceedings of IEEE Conference on Computer Vision and Pattern Recognition, Jul. 21, 2017, pp. 2770-2779.

Xue, et al., "Visual Dynamics: Probabilistic Future Frame Synthesis via Cross Convolutional Networks", In Journal of The Computing Research Repository, Jul. 9, 2016, 12 Pages.

Goodfellow, et al., "Generative Adversarial Nets", In Journal of Advances in Neural Information Processing Systems, Dec. 8, 2014, pp. 1-9.

He, et al., "Deep Residual Learning for Image Recognition", In Journal of Computing Research Repository, Dec. 2015, pp. 1-12.

Heeger, et al., "Pyramid-Based Texture Analysis Synthesis", In Proceedings of the 22nd Annual Cconference on Computer Graphics and Interactive Techniques, Sep. 15, 1999, pp. 229-238.

Hertzmann, et al., "Image Analogies", In Proceedings of the 28th Annual Conference on Computer Graphics and Interactive Techniques, Aug. 12, 2001, pp. 327-340.

Hinton, et al., "Reducing the Dimensionality of Data with Neural Networks", In Journal of Science, vol. 313, Jul. 28, 2006, pp. 504-507.

Ioffe, et al., "Batch Normalization Accelerating Deep Network Training by Reducing Internal Covariate Shift", In Journal of Computing Research Repository, Feb. 11, 2015, pp. 1-11.

Johnson, et al., "Perceptual Losses for Real-Time Style Transfer and Super-Resolution", In Journal of Computing Research Repository, Mar. 2016, pp. 1-18.

Kingma, et al., "Adam: A Method for Stochastic Optimization", In Journal of Computing Research Repository, Dec. 22, 2014, 9 Pages.

Krizhevsky, et al., "ImageNet Classification with Deep Convolutional Neural Networks", In Proceedings of 26th Annual Conference on Neural Information Processing Systems, Dec. 3, 2012, pp. 1-9.

Li, et al., "Combining Markov Random Fields and Convolutional Neural Networks for Image Synthesis", In Journal of the Computing Research Repository, Jan. 18, 2016, pp. 1-9.

Li, et al., "Precomputed Real-Time Texture Synthesis with Markovian Generative Adversarial Networks", In Proceedings of the 14th European Conference on Computer Vision, Oct. 8, 2016, 17 Pages.

Li, et al., "Motion Texture: A Two-Level Statistical Model for Character Motion Synthesis", In Proceedings of the 29th Annual Conference on Computer Graphics and Interactive Techniques, Jul. 23, 2002, pp. 465-472.

(56) References Cited

OTHER PUBLICATIONS

Liang, et al., "Realtime texture synthesis by patch-based sampling", In Journal of ACM Transactions on Graphics, vol. 20, Issue 3, Jul. 2001, pp. 127-150.
Lin, et al., "Scribblesup: Scribble-supervised convolutional networks for semantic segmentation", In Proceedings of IEEE Conference on Computer Vision and Pattern Recognition, Jun. 27, 2016, pp. 3159-3167.
Lin, et al., "Microsoft Coco: Common Objects in Context", In Proceedings of European Conference on Computer Vision, Sep. 6, 2014, pp. 1-16.
Long, et al., "Fully Convolutional Networks for Semantic Segmentation", In Proceedings of the IEEE Conference on Computer Vision and Pattern Recognition, Jun. 7, 2015, pp. 3431-3440.
Portilla, et al., "A Parametric Texture Model Based on Joint Statistics of Complex Wavelet Coefficients", In International Journal of Computer Vision, vol. 40, Issue 1, Oct. 2000, pp. 49-71.
Malik, et al., "Textons, Contours and Regions: Cue Integration in Image Segmentation", In Proceedings of the 7th IEEE International Conference on Computer Vision, vol. 2, Sep. 20, 1999, pp. 918-925.
Reed, et al., "Deep Visual Analogy-Making", In Proceedings of the 28th International Conference on Neural Information Processing Systems, Dec. 7, 2015, pp. 1-9.
Rother, et al., "Grabcut: Interactive Foreground Extraction using Iteraed Graph Cuts", In Journal of ACM Transactions on Graphics, vol. 23, Issue 3, Aug. 2004, pp. 309-314.
Russakovsky, et al., "ImageNet Large Scale Visual Recognition Challenge", In International Journal of Computer Vision, vol. 115, Issue 3, Dec. 2015, 43 Pages.
Selim, et al., "Painting Style Transfer for Head Portraits using Convolutional Neural Networks", In Journal of ACM Transactions on Graphics, vol. 35, Issue 4, Jul. 2016, 18 Pages.
Simonyan, et al., "Very Deep Convolutional Networks for Large-Scale Image Recognition", In Journal of the Computing Research Repository, Sep. 4, 2014, pp. 1-10.
Ulyanov, et al., "Texture Networks: Feed-forward Synthesis of Textures and Stylized Images.", In Proceedings of the 33rd International Conference on Machine Learning, Jun. 19, 2016, 9 Pages.
Ulyanov, et al., "Instance Normalization: The Missing Ingredient for Fast Stylization", In Journal of the Computing Research Repository, Jul. 27, 2016, 6 Pages.
Gatys et al., "Image Style Transfer Using Convolutional Neural Networks", The IEEE Conference on Computer Vision and Pattern Recognition (CVPR): 2414-2423 (2016).
Gatys et al., "A Neural Algorithm of Artistic Style", arXiv:1508.06576v2 [cs.CV] (2015).
Taigman et al., "Unsupervised Cross-Domain Image Generation", arXiv:1611.02200v1 [cs.CV], Cornell University Library (2016).
Gatys et al., "Texture Synthesis Using Convolutional Neural Networks", arXiv:1505.07376v3 [cs.CV] (2015).
International Search Report and Written Opinion for PCT/US2016/065664, dated Mar. 9, 2018.
"Office Action Issued in European Patent Application No. 17825335.7", dated Apr. 12, 2021, 5 Pages.
"Third Office Action Issued in Chinese Patent Application No. 201611170887.4", dated Dec. 6, 2021, 23 Pages.
Papari, et al., "Artistic Stereo Imaging by Edge Preserving Smoothing", In Proceeding of IEEE 13th Digital Signal Processing Workshop and 5th IEEE Signal Processing Education Workshop, Jan. 4, 2009, pp. 639-642.
Huang, et al., "Generation of Stereo Oil Paintings from RGBD Images", In Proceeding of International Conference on Machine Vision and Information Technology, Feb. 17, 2017, pp. 64-68.
"International Search Report and Written Opinion Issued in PCT Application No. PCT/US2019/012588", dated Jun. 13, 2019, 23 Pages.
"First Office Action and Search Repost Issued in Chinese Patent Application No. 201810036211.9", dated Aug. 19, 2020, 16 Pages.

\* cited by examiner

IMAGE STYLIZATION BASED ON LEARNING NETWORK

CROSS-REFERENCE TO RELATED APPLICATION

This application is a U.S. National Stage Application of PCT/US2017/065664, filed Dec. 12, 2017, which claims benefit of Chinese Patent Application No. 201611170887.4, filed Dec. 16, 2016, which applications are hereby incorporated by reference. To the extent appropriate, a claim of priority is made to each of the above disclosed applications.

BACKGROUND

Image stylization is to transform an original style of an image into other desired styles. A style of an image may also be referred to as a texture style of the image, which involves one or more texture features presented on the image surface, including, but not limited to, color matching, shading, the use of lines, and the like. The style of the image may involve some characteristic of the image in a certain aspect, for example, line drawings of objects in a sketch style or coarsening strokes in a painting style. In some cases, a style of an image may cover characteristics of the image in a plurality of aspects. For example, different works of many painters may be regarded as having different styles, and such styles may be embodied by colors, lights, lines, and the like in their paintings. When a style of an image is transformed, the content captured in that image remains substantially unchanged. For example, if an original image includes objects like buildings, people, sky, plants, and the like, these objects may still be maintained after the image stylization, and only their texture features are changed to embody the transformed texture style.

The function of image stylization may be provided by an electronic device having processing capability, such as a smartphone or a personal computer. In some use cases, a user may be allowed to select a specific style from different image styles to process an image input by the user. Most of current implementations of image stylization impose a relatively high requirement on processing resources and consume considerable time, which is not desired by a user who possesses an electronic device of limited processing resources and expects a rapid presentation of results.

SUMMARY

In accordance with implementations of the subject matter described herein, there is provided a solution of image stylization based on a learning network. In this solution, a learning network is trained with a plurality of images and a reference image with a particular texture style. A plurality of different sub-networks of the learning network is trained, respectively. Specifically, one of the sub-networks is trained to extract one or more feature maps from the source image and transform the feature maps with the texture style applied thereon to a target image. Each of the feature maps indicates part of feature information of the source image. Another sub-network is trained to apply a specified texture style to the extracted feature maps, such that the target image generated based on the processed feature maps can embody the specified texture style. Through the solution of the subject matter described herein, image feature extraction and image stylization processing are separated and the stylization processing is performed in the feature space of the image, which is advantageous to reduce the processing time and resource consumption. In addition, the separation of the image feature extraction and stylization processing can also support training of sub-networks corresponding to respective texture styles such that the learning network has high flexibility to provide more texture styles.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION OF EMBODIMENTS

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

Example Environment

Figure 1:
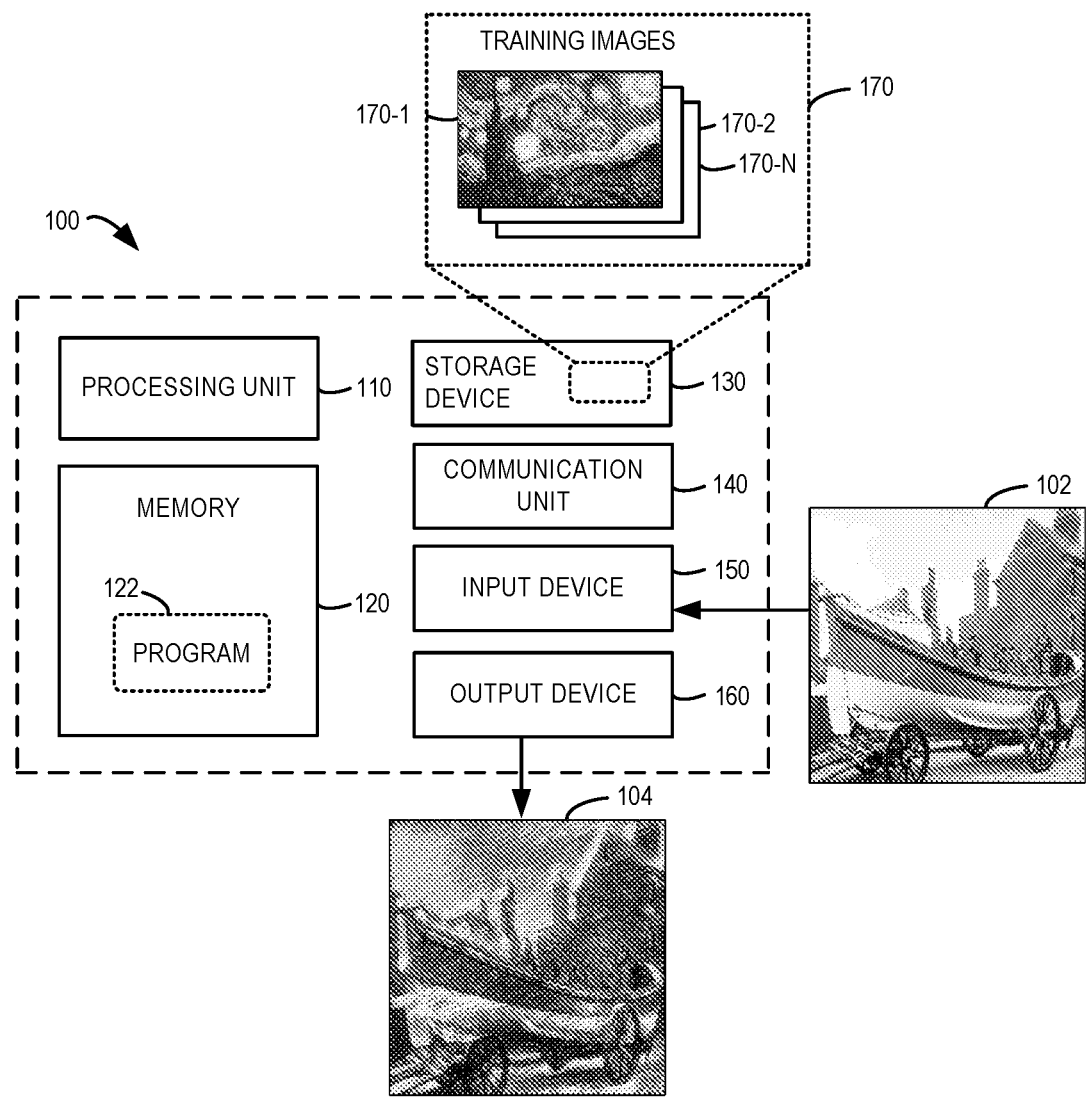
FIG. 1 illustrates a block diagram of a computing device in which implementations of the subject matter described herein can be implemented.

Basic principles and several examples of the subject matter described herein will be described hereinafter with reference to the drawings. FIG. 1 illustrates a block diagram of a computing device 100 in which implementations of the subject matter described herein can be implemented. It would be appreciated that the computing device 100 shown in FIG. 1 is merely for illustration but not limit the function and scope of implementations of the subject matter described herein in any manners. As shown in FIG. 1, the computing device 100 includes a computing device 100 in a form of a general-purpose computing device. The components of the computing device 100 may include, but are not limited to, processor(s) or processing unit(s) 100, a memory 120, a storage device 130, communication unit(s) 140, input device(s) 150, and output device(s) 160.

In some implementations, the computing device 100 may be implemented as various user terminals or service terminals. The service terminals may be servers, large-scale computing devices, and the like provided by various service providers. The user terminals, for example, are any type of mobile terminals, fixed terminals, or portable terminals, including a mobile phone, site, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, wireless broadcast receiver, E-book device, game device, or any combination thereof, including the accessories and peripherals of these devices or any combination thereof. It would be contemplated that the computing device 100 can support any type of interface for a user (such as "wearable" circuitry and the like.).

The processing unit 100 can be a physical or virtual processor and perform various processes based on programs stored in the memory 120. In a multiprocessor system, a plurality of processing units executes computer executable instructions in parallel to improve parallel processing capability of the computing device 100. The processing unit 110 can be referred to as a central processing unit (CPU), a microprocessor, a controller, or a microcontroller.

The computing device 100 usually includes various computer storage media. Such media can be any available media accessible to the computing device 100, including but not limited to volatile and non-volatile media, and removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The memory 120 includes one or more program products 122 having one or more sets of program modules configured to perform functions of various implementations described herein. The storage device 130 can be any removable or non-removable media and may include machine-readable media, such as a memory, flash drive, disk, and any other media, which can be used for storing information and/or data and accessed in the computing device 100.

The computing device 100 may further include additional removable/non-removable, volatile/non-volatile storage media. Although not shown in FIG. 1, a disk drive is provided for reading from or writing to a removable and non-volatile disk, and a disc drive is provided for reading from or writing to a removable and non-volatile disc. In such case, each drive may be connected to a bus (not shown) via one or more data media interfaces.

The communication unit 140 communicates with a further computing device via communication media. Additionally, functions of components in the computing device 100 can be implemented by a single computing cluster or multiple computing machines connected communicatively for communication. Therefore, the computing device 100 can be operated in a networking environment using a logical link with one or more other servers, network personal computers (PCs) or another general network node.

The input device 150 may include one or more input devices such as a mouse, keyboard, tracking ball, voice-input device, and the like. The output device 160 may include one or more output devices such as a display, loudspeaker, printer, and the like. As required, the computing device 100 can also communicate via the communication unit 140 with one or more external devices (not shown) such as a storage device, display device, and the like, one or more devices that enable users to interact with the computing device 100, or any devices that enable the computing device 100 to communicate with one or more other computing devices (for example, a network card, modem, and the like). Such communication is performed via an input/output (I/O) interface (not shown).

The computing device 100 may be provided for performing image stylization in various implementations of the subject matter described herein. Therefore, the computing device may also be referred to as an "image processing device 100" hereinafter. When performing the image stylization, the image processing device 100 can receive a source image 102 via the input device 150. The image processing device 100 may process the source image 102 to transform an original style of the source image 102 into a specified style, and output the stylized image 104 via the output device 160. In the context, a style of an image is also referred to as a texture style of the image. The texture style relates to one or more texture features of one or more regions in the image presented in aspects of color, light, line, and the like, which include, but are not limited to, color matching, light transition, strokes, line thickness and curving, and the like.

In order to transform the style, the image processing device 100 may pre-construct a model for image stylization and train the model with training images 170. As shown, the training image 170 may, for example, be stored in the storage device 130, or may, of course, be stored in other storage devices accessible to the device 100. The training images 170 may include a reference image 170-1 with a particular texture style, and a plurality of other images 170-2 to 170-N. The other images 170-2 to 170-N may be any images with other texture styles than that of the reference image 170-1. Based on the training images 170, the model training may be trained as being capable of transforming the texture styles of the different images 170-2 to 170-N into the texture style of the reference image 170-1. Therefore, with the trained model, the image processing device 100 may transform the current input source image 102 into an image 104 with a texture style similar to that of the reference image 170-1. For example, the color matching and the use of lines in the image 104 are similar to those in the reference image 170-1, although the image 104 still includes the content of the source image 102.

It would be appreciated that the images 102, 104, and 170-1 as shown in FIG. 1 are only for illustration. Any image 102 may be input to the image processing device 100 for processing, and the model can be trained based on any reference image 107-1. Based on different models and training methods, the obtained stylized image 104 may be different. There are various model-based solutions for image stylization. One typical model is a neural network. The neural network usually includes a plurality of layers, each of which includes some neurons. The neural network is characterized in its strong learning capability, and it may obtain a processing capability from training data during the training process to perform corresponding processing on new data. Therefore, the neural network may be referred to as a "learning network" or "learning model." The terms "learning model," "learning network," "neural network," "model," and "network" are used interchangeably hereinafter.

The number of layers and the number of neurons in the neural network determine a depth (a learning capability) of the network. In the training process, the neural network is trained with training data such that parameters of each neuron and mapping parameters between layers or neurons of the neural network can be determined. The trained neural network may have a specific processing capability. For example, the neural network may be trained to transfer the style in the reference image to the input source image. Although the neural network can provide a strong capability for image stylization, current neural network-based solutions have many defects in terms of computational efficiency and stylization flexibility.

A technical solution of image stylization based on a neural network provides real-time learning and processing of image style. In this technical solution, the neural network was not trained by a specific reference image. When style conversion is required to be performed for an input source image, a reference image with a desired texture style may be input into the neural network together with the source image. A loss function of the neural network is set such that an output image achieves a balance between the reference image and the source image. As such, the neural network is continuously updated in a forward direction from input to output and in a backward direction from output to input. When it is needed in processing a new source image and/or transforming a style of the source image into another texture style, the neural network is continuously updated for the new source image and/or a reference image to provide the corresponding stylized image. Since each source image and the desired reference image are learned and processed in real time, the output image may better present the texture style of the reference image. Nonetheless, this result is at the cost of high consumption of computing resource and time because the learning process of the neural network is a process consuming resources and time.

Instead of updating the neural network in real time during the usage, another technical solution of image stylization uses a trained neural network to apply a specific texture style to different source images. In the technical solution, the neural network is trained in advance based on a reference image with the specific texture style and a plurality of different source images, such that the neural network can acquire the capability of applying the texture style to an input image. During the usage, if a new source image is needed to be stylized, this image is directly used as input to the neural network. According to the parameters of the trained neural network, the output image is computed as having a style similar to the specific texture style. This solution can quickly produce a result during the usage, despite a certain accuracy loss. However, the neural network lacks expandability since the whole neural network is trained to be specific to one texture style. When a further texture style is needed, a new independent neural network is trained for this texture style.

In addition, a common problem of the conventional technical solutions further lies in that the texture style and the image content cannot be separated. Since the source image and the reference image are jointly used as the training image to train the whole neural network, it is difficult to differentiate which part of the neural network is only used for the texture style and which part is used to process the content of the source image. In fact, all parameters of such neural network are trained to achieve a final target, that is, to produce an output image that not only includes the content of the source image but also presents the texture style of the reference image. In other words, the neural network can only learn, as a whole, to apply the texture style of the reference image to the content of the source image. Such neural network can be considered as a "black box," and it thus is difficult to perform extension on this neural network to obtain a processing capability of providing more different texture styles.

Model Architecture and Model Training

In accordance with implementations of the subject matter described herein, a new solution of image stylization based on a learning network (neural network) is provided. In this solution, a learning network is constructed for image feature extraction and image stylization processing, where the image feature extraction and image stylization processing are separable. Unlike the conventional technical solutions in which the whole learning network is trained to performing processing in an image content space, the learning network provided according to the subject matter described herein includes a separate sub-network for performing image stylization processing in a feature space of the image. The image features onto which a particular texture style is applied are then converted from the feature space to the content space to obtain the final target image. By means of the separate image stylization process, the processing efficiency may be improved and the trained learning network may be easily expanded to provide processing of more different texture styles. Further, such learning network also has advantages of rapid processing and flexible fusion of styles in use.

Figure 2:
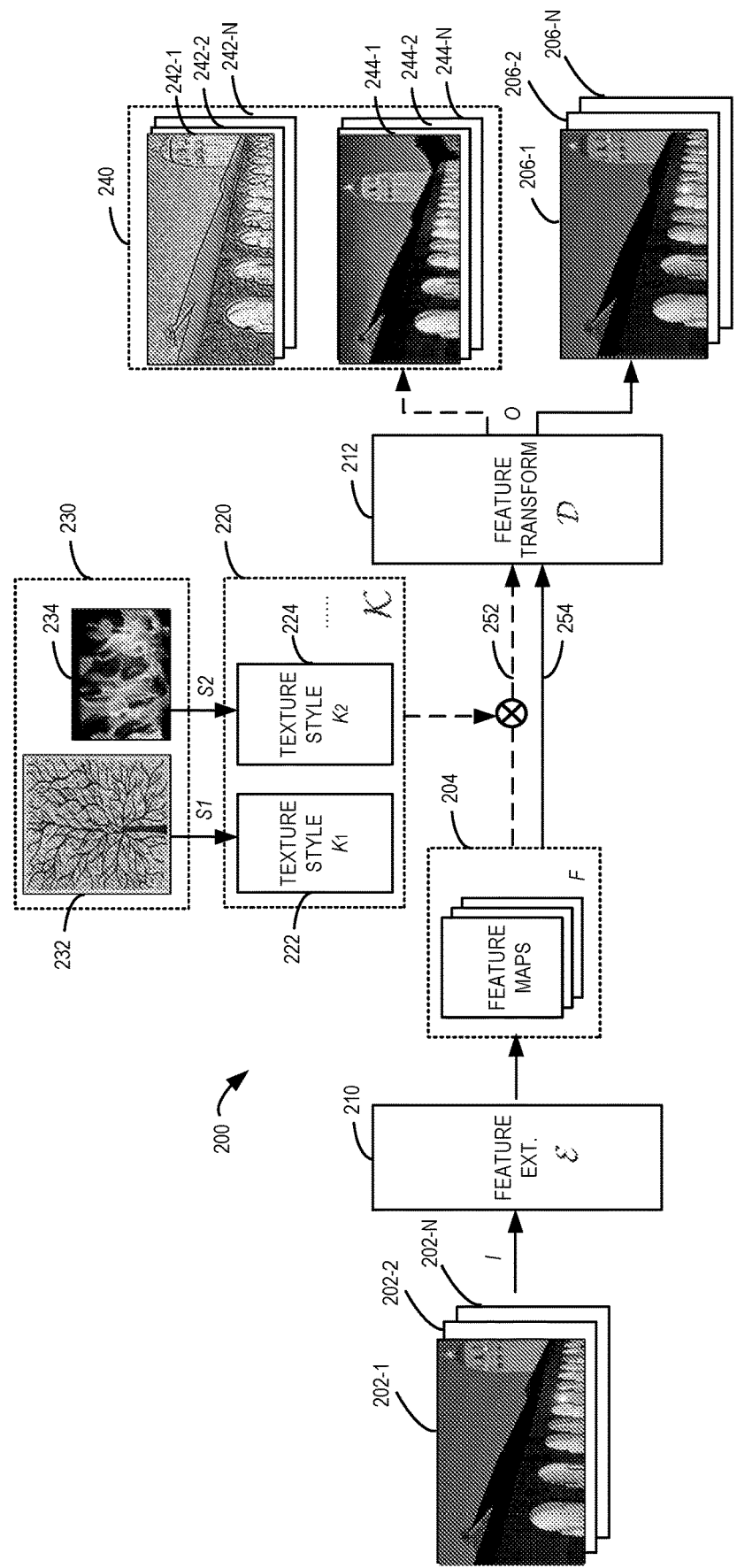
FIG. 2 illustrates a block diagram of a learning network for image stylization in accordance with an implementation of the subject matter described herein.

Implementations of the subject matter described herein will be further described below with reference to specific embodiments. Reference is first made to FIG. 2, which illustrates an overall structure of a learning network 200. As shown, the learning network 200 includes a feature extraction part 210, a feature transform part 212, and a feature stylization part 220. The feature extraction part 210 is configured to extract one or more feature maps 204 from an input image. Each of the feature maps 204 indicates part of feature information of the input image, such as information of one or more objects in the input image, including colors, profiles, edges, lines, and the like. The feature extraction part 210 performs operations substantially reverse to those of the feature transform part 212 to regenerate an image based on the feature maps. Thus, the feature extraction part 210 may be referred to as an encoder part, and the feature transform part 212 may be referred to as a decoder part. According to the implementations of the subject matter described herein, the feature extraction part 210 and the feature transform part 212 constitute a sub-network of the learning network 200 for transforming image content.

In some implementations, the feature extraction part 210 and the feature transform part 212 may consist of a plurality of layers of the neural network. A plurality of layers in a Convolutional Neural Network (CNN) with excellent performance in the aspect of image processing may be utilize to form the feature extraction part 210. For example, the feature extraction part 210 may consist of a plurality of convolution layers for feature extraction. The feature transform part 212 may be arranged symmetrically. As an example, if the feature extraction part 210 includes one stride-1 convolution layer and two stride-2 convolution layers, then the feature transform part 212 may include two stride-1/2 convolution layers and one stride-1 convolution layer. Each convolution layer forming the feature extraction part 210 and the feature transform part 212 may consist of a plurality of convolution filters (convolution kernels or neurons). Each convolution filter is provided for performing a convolution operation for a patch in an input image (or an output of a preceding layer). By selecting the convolution filters, particular information of the image (for example, colors, profiles, edges, lines, and the like of one or more objects) may be extracted.

Additionally, an activation layer for performing non-linear conversion (being consisted of a non-linear activation function, for example, a ReLU function) and/or a layer for performing normalization are provided after each convolution layer in the feature extraction part 210 and the feature transform part 212. In some implementations, the last layers of the parts 210 and 212 may be set as convolution layers. Of course, this is not a necessity. It would be appreciated that only some specific embodiments of the feature extraction part 210 and the feature transform part 212 are described above. In other implementations, the feature extraction part 210 and the feature transform part 212 can be configured in other manner to achieve extracting the feature maps from the image content and transforming the feature maps into image content. The number of the feature maps output by the feature extraction part 210 may be determined by the number of convolution kernels in the last convolution layer.

The image stylization part 220 is configured to process in the feature space of the image to apply corresponding texture style(s) to the feature maps of the image. It can be seen from FIG. 2 that, in the learning network 200, the feature extraction operation of the feature extraction part 210 is independent from the image stylization part 220. The image stylization part 220 may include sub-networks for applying different texture styles, such as a texture style sub-network 222 and a texture style sub-network 224. Each texture style sub-network may be comprised of a plurality of layers of CNN, for example, may include a plurality of convolution layers, each of which includes a plurality of convolution filters for performing convolution. As described above, processing of a convolution filter performs a convolution operation on a patch (corresponding to a region in the input image) of the input data (that is, the feature maps 204 of the source image). The specific principles of the image stylization performed in the feature space will be described in detail below.

The number of the processed feature maps by the texture style sub-network may be determined by the number of the convolution kernels in the last convolution layer of the sub-network. That is, the number of the processed feature maps by the texture style sub-network may be changed but still can be combined to represent the feature information of the source image, but the feature information has been processed to obtain a certain texture style.

It would be appreciated that, although only two sub-networks are shown, the learning network 200 may be configured to include only one texture style sub-network, or two or more texture style sub-networks in other implementations. In fact, as the image feature is separated from the image stylization, any number of texture style sub-networks may be flexibly set in the image stylization part 220.

Figure 3:
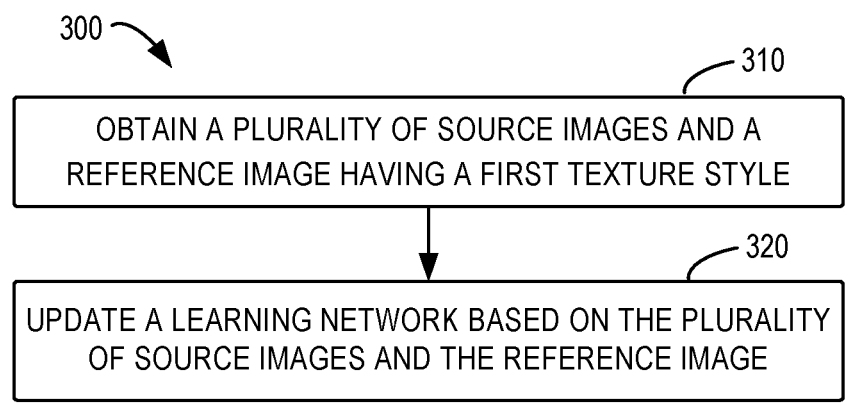
FIG. 3 illustrates a flowchart of a training process for the learning network of FIG. 2 in accordance with an implementation of the subject matter described herein.

In order to allow the learning network 200 to have a capability of image stylization, training images are used to train the network after the architecture of the learning network 200 has been configured. FIG. 3 illustrates a training process 300 for the learning network 200 in accordance with an implementation of the subject matter described herein. At 310, a plurality of source images and reference images with respective texture styles are obtained. The source images and the reference image may be collectively referred to as training images. As shown in FIG. 2, the training images may include a plurality of source images 202-1, 202-2, . . . , 202-N (collectively referred to as source images 202) and reference image(s) 230 with corresponding texture style(s). The number of the reference images 230 is determined by the number of the texture sub-networks to be trained. For example, if the image stylization part 220 includes two texture sub-networks 222 and 224, two reference images 232 and 234 are used to train the two sub-networks, respectively.

At 320, the learning network 200 is updated based on the obtained source images 202 and the reference images 230. The training process of the learning network 200 is actually a process of continuously updating the parameters of the learning network 200 (including weights of the neurons contained in each layer of the network). The termination of the updating may be determined by convergence of a loss function that is set. The parameters of the learning network 200 may be set as random values in an initial phase and then updated continuously with the training process. The learning network that obtains the final convergence is a trained network.

In order to enable processing separation of the feature extraction and the image stylization, during the training process, the plurality of source images 202 are mainly used to train the feature extraction part 210 and the feature transform part 212 while the reference images 230 with different texture styles may be used to train the respective texture style sub-networks. For example, the reference image 232 is used to train the texture style sub-network 222, and the reference image 234 is used to train the texture style sub-network 224. Consequently, the training process may be divided into training of two branches 252 and 254, where the first branch 252 includes training of the feature extraction part 210 and the feature transform part 212, and the second branch 254 includes training of the respective texture style sub-networks in the image stylization part 220 (of course, this branch involves the feature extraction part 210 for receiving input source images and the feature transform part 212 for providing the output images). The training process of the two branches will be described below.

In the training of the first branch 252, the training objective is to train the feature mapping part 210 to be capable of extracting feature maps from the source images 202, and the feature transform part 212 is trained such that the output images 206-1, 206-2, . . . , 206-N (collectively referred to as output images 206) transformed from the feature maps are similar to the input source images 202-1, 202-2, . . . , 202-N, respectively. It is supposed that the feature extraction part 210 is represented as $\varepsilon$ and the feature transform part 212 is represented as $\mathcal{P}$. After passing through the training feature extraction part 210, one or more feature maps (collectively represented as F) are extracted from each source image 202 (represented as I), that is, $F = \varepsilon(I)$. The output image O generated by the feature transform part 212 based on the feature maps F will continuously approximate the input image I, that is, O=$\mathcal{D}$(F)→I. Hence, a loss function may be measured by a difference between the output image O and the input image I. In one example embodiment, a loss function $\mathcal{L}_I$ may be computed as the minimum mean square error (MSE) between the output image O and the input image I, which is represented as follows:

$$\mathcal{L}_I(I,O)=\|O-I\|^2 \qquad (1)$$

In the training of the second branch 254, the training objective is to train each texture style sub-network to be capable of applying the respective texture style to the feature maps 204 of the source images 202. After applying the texture style by this sub-network, the stylized images 240 output by the feature transform part 212 may achieve balances between the source images 202 and the reference image 230. Due to the balance, the style similarity between a stylized image 240 and the corresponding source image 202 and the style similarity between the stylized image 240 and the reference image 230 may be substantially identical or have a difference less than a predetermined threshold. Meanwhile, in order to maintain the image content, the difference between the content of the image 240 and the content of the source image 202 may not be great. For example, the texture style sub-network 222 is trained to make output images 242-1, 242-2, ..., 242-N (collectively referred to as output images 242) to reach respective balances between the reference image 232 and the corresponding source images 202-1, 202-2, ..., 202-N, and the texture style sub-networks 224 is trained to make output images 244-1, 244-2, ..., 244-N (collectively referred to as output images 244) to reach respective balances between the reference image 234 and the corresponding source images 202-1, 202-2, ..., 202-N.

It is supposed that the image stylization part 220 is represented as $\mathcal{K}$ which includes n texture style sub-networks (represented as $K_i$, wherein i={1, ..., n}). The reference image for training each texture style sub-network $K_i$ is represented as $S_i$. The processed feature maps $\tilde{F}_i$ are obtained after each texture style sub-network $K_i$ performs convolution on the feature maps F of the source image. Such convolution operation may be represented as:

$$\tilde{F}_i = K_i \otimes F \qquad (2)$$

where $F \in \mathcal{R}^{c_{in} \times h \times w}$, $K_i \in \mathcal{R}^{c_{out} \times c_{in} \times k_h \times k_w}$, $\tilde{F} \in \mathcal{R}^{c_{out} \times h \times w}$, and $c_{in}$ and $c_{out}$ represent the numbers of the feature maps F and feature channels of $\tilde{F}_i$, respectively, (h,w) represents the size of the feature maps, and $k_w$, $k_h$ represents the size of the convolution filter in the texture style sub-networks $K_i$. In the branch 254, the processed feature maps $\tilde{F}_i$ are transformed by the feature transform part 212 into the output images $O_i$. The output image $O_i$ stylized by each texture style sub-network $K_i$ may be represented as $O_i = \mathcal{D}(\tilde{F}_i)$.

In the second branch 254, the loss function for training each texture style sub-network $K_i$ may be set as to minimize the difference between the source image I, the reference image $S_i$, and the stylized output image $O_i$. In order to achieve image stylization, there will always be a difference among these three images, and the loss function therefore may not be set based on the difference between respective pixels of these images, but based on a perceptual difference of the whole images. The perceptual difference may be determined from various aspects. First, it is desired to ensure the contents of the output image $O_i$ and the input source image I to be substantially consistent, and thus the content difference between the output image $O_i$ and the input source image I is taken into account in the perceptual difference. Second, it is also desired that the output image $O_i$ and the reference image $S_i$ have similar styles, and thus the style difference between these two images is considered in the perceptual difference. Alternatively, or in addition, variation regularization of the output image $O_i$ itself may be also considered. These differences may be weighted to constitute an overall perception difference among the three images I, $S_i$, and $O_i$.

The loss function $\mathcal{L}_K$ (also referred to as a perceptual loss function) of the second branch 254 may be determined based on the above perceptual difference as follows:

$$\mathcal{L}_K(I,S_i,O_i) = \alpha \mathcal{L}_c(O_i,I) + \beta \mathcal{L}_s(O_i,S_i) + \gamma \mathcal{L}_{tv}(O_i) \qquad (3)$$

where $\mathcal{L}_c$ represents the content difference between the output image $O_i$ and the input source image I, $\mathcal{L}_s$ represents the style difference between the output image $O_i$ and the reference image $S_i$, $\mathcal{L}_{tv}$ is the variation regularization of the output image $O_i$, and α, β, and γ represent respective weights for the content difference, style difference, and variation regularization.

Various methods, which are currently known or to be developed in the future, may be used to estimate the content difference $\mathcal{L}_c$, style difference $\mathcal{L}_s$ and variation regularization $\mathcal{L}_{tv}$. Examples of computing the content difference $\mathcal{L}_c$ and style difference $\mathcal{L}_s$ may be found in L. A. Gatys, A. S. Ecker, and M. Bethge, "A neural algorithm of artistic style," *arXiv preprint arXiv*:1508.06576, 2015. Some examples of the variation regularization $\mathcal{L}_{tv}$ may be found in H. A. Aly and E. Dubois, "Image up-sampling using total-variation regularization with a new observation model," *IEEE Transactions on Image Processing*, 14(10): 1647-1659, 2005, and J. Johnson, A. Alahi, and L. Fei-Fei, "Perceptual losses for real-time style transfer and super-resolution," *arXiv preprint arXiv*:1603.08155, 2016. It would be appreciated that other measuring methods may be utilized to determine the differences among the source image I, the reference image $S_i$, and the stylized output image $O_i$ for training stylization processing.

Based on the loss function $\mathcal{L}_I$ of the first branch 252, the feature extraction part 210 and the feature transform part 212 are continuously updated based on a principle of backward propagation of gradients. Specifically, the same source images may be iteratively input to the feature extraction part 210 for a plurality of times, the parameters of the feature extraction part 210 and the feature transform part 212 are updated every time in a certain gradient, and then whether the loss function $\mathcal{L}_K$ is converged is checked. The convergence condition may be predetermined. Furthermore, based on the loss function $\mathcal{L}_K$ of the second branch 254, the parameters of the image stylization part 220 may be updated similarly based on the principle of backward propagation of gradients. The training of the second branch 254 may involve updating each texture style sub-network, respectively. Instead of the source images 202, the updating of each texture style sub-network is dependent on the respective reference image 230. The training process of each branch may be considered as an end-to-end training process.

In some implementations, in the training of the two branches 252 and 254, the parameters of the feature extraction part 210 and the feature transform part 212 may be first determined and the image stylization part 220 may then be trained. In some other implementations, in order to balance the feature extraction and the image stylization, the first branch 252 and the second branch 254 may be trained alternately. In the alternate training process, after updating the image stylization part 220 every T times (T≥1), the feature extraction part 210 and the feature transform part 212 can be updated once. It would be appreciated that, at the initial time, the image stylization part 220 may be first updated T times or the feature extraction part 210 and the feature transform part 212 may be first updated once, and then the two branches are updated alternately. This updating method may be referred to as a (T+1) iterating method. T may be a value of 2, 3, 5, 10, and the like. The scope of the subject matter described herein is not limited in this aspect. Of course, it would be appreciated that, in each round of iteration in the alternate training process, the feature extraction part 210 and the feature transform part 212 may be updated twice or more. In some implementations, as the task of the part for image stylization is more important and complicated, the updating times for the second branch 254 may be greater than the updating times for the first branch 252.

In some implementations, the updating of the second branch 254 only includes updating the image stylization part 220. That is, in the updating process of the second branch 254, the parameters of the feature extraction part 210 and the feature transform part 212 remain unchanged. Alternatively, in order to restrain the parameters of the feature extraction part 210 and the feature transform part 212 so that they become more suitable for processing in the context of image stylization rather than general processing, in addition to being updated in the first branch 252, the feature extraction part 210 and the feature transform part 212 may be jointly updated together with the image stylization part 220 in the second branch 254. For example, during the T times of updating the image stylization part 220, the feature extraction part 210 and the feature transform part 212 are also updated. In this process, the gradient for updating the feature extraction part 210 and the feature transform part 212 may be small.

The configuration and training processes of the learning network 200 for image stylization have been described above. The images 202-1, 232-234, 242-1, 244-1, and 206-1 are merely shown in FIG. 2 for illustration, and in other implementations, the learning network 200 may be trained using any other source images and reference images.

In the learning network 200, by performing the image stylization in the feature space, the feature extraction and the stylization processing may be separated. Such network architecture is advantageous to increase the computing efficiency. For example, since the feature extraction part 210 and the feature transform part 212 are only configured to perform the tasks of feature extraction and feature transform, these two parts do not impose high requirements on the network depth and thus may be implemented by a relatively simple neural network structure. In addition, the sub-networks for implementing stylization processing of a plurality of texture styles may share the same feature extraction part 210 and feature transform part 212, and no separate learning network is required for each texture style, which thereby further improves the training efficiency of image stylization. Moreover, this network architecture also helps improve the efficiency and the flexibility of the image stylization during operation, which will be further discussed in the section of "Model-based image stylization."

Extension of Model

Training of the learning network 200 has been described above when one or more texture sub-networks of the image stylization part 220 have been preconfigured in the learning network 200. In some cases, it may be desired to further expand an image stylization capability of the learning network 200 after it is trained. As the learning network 200 includes a specific part (that is, the part 220) for image stylization processing, it is convenient to add a new texture stylization sub-network and continue to train this sub-network.

Figure 4:
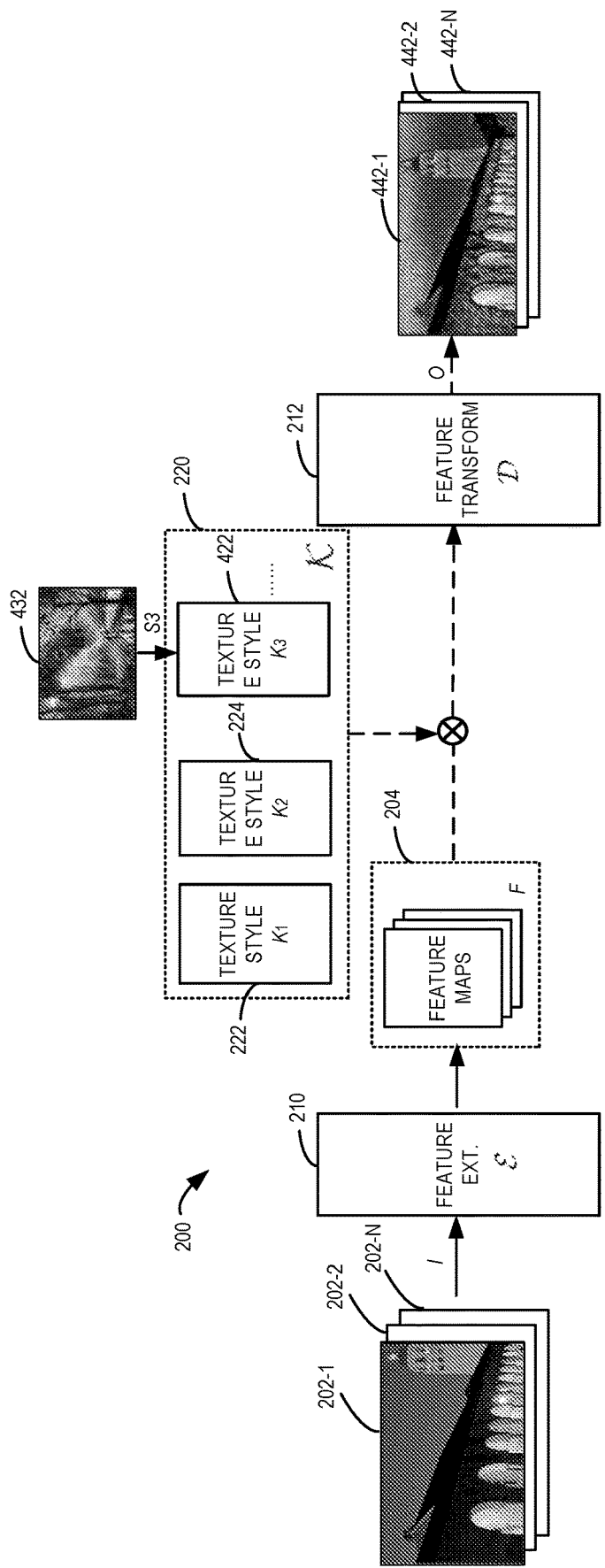
FIG. 4 illustrates a block diagram of an extension for the learning network of FIG. 2 in accordance with an implementation of the subject matter described herein.

FIG. 4 illustrates an example of the expanded learning network 200. In this example, a new texture style sub-network, that is, a texture style sub-network 422 (represented as $K_3$), is added to the image stylization part 220. The texture style sub-network 422 is trained with a reference image 432 with a particular texture style so that the texture style of the reference image 432 can be applied to the feature maps 204 of the source image 202. Since the other parts of the learning network 202 have been trained, in the training process of the texture style sub-network 422, only the parameters of the texture style sub-network 422 are continuously updated but the parameters of other parts (including the feature extraction part 210, the feature transform part 212, and other trained texture style sub-networks 222 and 224) are fixed. Therefore, although the source image 202 will still be input to the feature extraction part 210, the parameters of this part are not changed but only be offered to assist in updating the texture style sub-network 422.

The training of the texture style sub-network 422 also aims at making the output images 442-1, 442-2, ..., 442-N (collectively referred to as output images 442) of the feature transform part 212 each achieve balances between the reference image 432 and the corresponding source images 202-1, 202-2, ..., 202-N. In other words, the output image 442 is similar to the source image 202 in terms of content and similar to the reference image 432 in terms of texture style. The training of the texture style sub-network 422 is similar to that of the texture style sub-networks 222 and 224 in the image stylization part 220 as described with reference to FIG. 2, and the difference only lies in that the parameters of the feature extraction part 210 and the feature transform part 212 are not updated during the training. For brevity, this training process is omitted here. Since only the texture style sub-network 422 is trained, the training process may be completed at a fast speed (for example, within several minutes or tens of seconds).

It would be appreciated that the reference image 432 and the output image 442-1 as shown in FIG. 4 are only for illustration, and any other images can also be used as reference images for training a new texture style sub-network. Dependent on the network architecture, the output image 442-1 may be varied. Although FIG. 4 only illustrates adding one new texture style sub-network to the trained learning network 200, more sub-networks may be added to the learning network 200 at the same time or sequentially in other examples. In some implementations, one or more trained texture style networks may be removed from the learning network 200 without affecting operations of other texture style sub-networks. The flexible scalability of the learning network 200 provides convenience to the user, such that the user can add and/or remove processing of a particular texture style(s) to and/or from the learning network 200 as needed.

Stylization Processing in Feature Space

As mentioned above, in implementations of the subject matter described herein, the image stylization provided by the learning network 200 is performed in the feature space of an input image. In conventional solutions of image stylization, since the feature extraction and image stylization are processes that cannot be separated explicitly, the image stylization process is in fact merged in each layer of the whole neural network. This process may also be regarded as direct stylization processing on the image content. However, the inventors have found that the process of transforming the processed feature maps into an image after performing the stylization processing in the feature space of the image can achieve the same effect as directly applying the texture style onto the image content. Such process is verified below with reference to FIG. 5.

Figure 5:
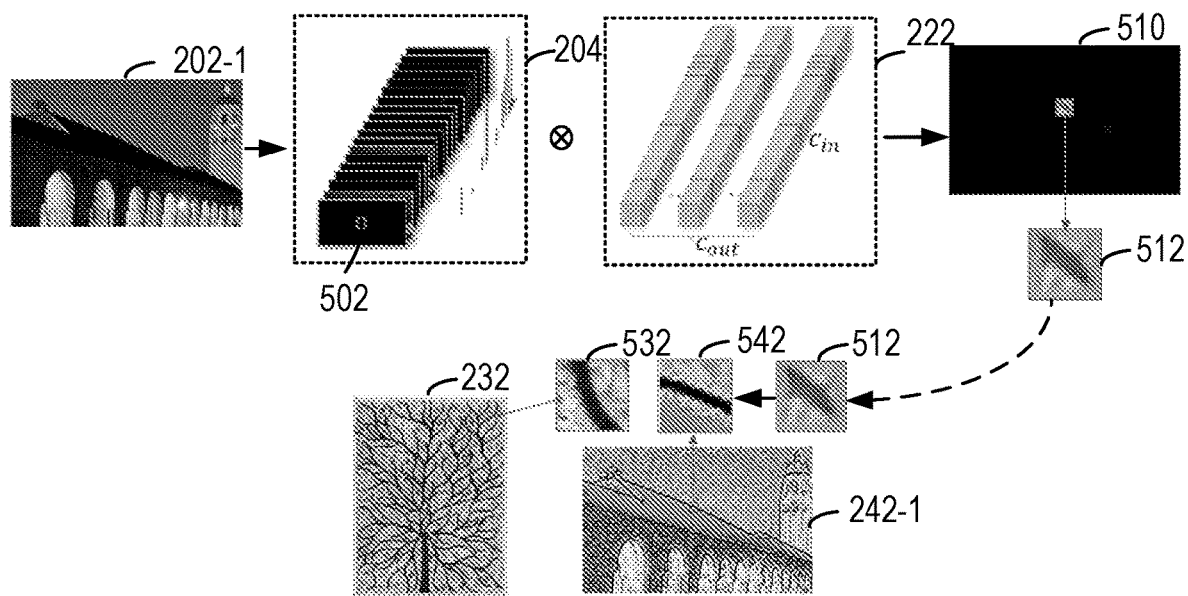
FIG. 5 illustrates a schematic diagram of performing stylization in a feature space in accordance with an implementation of the subject matter described herein.

FIG. 5 illustrates a schematic diagram of performing stylization in a feature space. In FIG. 5, applying stylization by the texture style sub-network 222 to the feature maps 204 of the source image 202-1 is taken as an example. For illustration, only stylization performed on a patch 502 of the feature maps 204 is shown (and the values of other patches in the feature maps 204 therefore are set as 0). The texture style sub-network 222 includes a plurality of convolution filters (also referred to as a filterbank). After being trained, a certain channel combination of each filter and the corresponding channel combination of the patch 502 are convoluted, and the convoluted feature patch 512 is transformed by the feature transform part 212 as the patch 542 in the output image 242-1 (that is, the stylized image 242-1).

As compared, it can be seen that the patch 512 in the output image 242-1 is quite similar in appearance to the patch 532 of the reference image 232 and can partially embody the style of the reference image 232. This demonstrates that the channels of the convolution filters of the texture style sub-network 222 obtained by the training encodes a certain texture style unit of the reference 232, namely the patch 532. Thus, the patch 532 of the reference image 232 may be regarded as partially representing the texture style of the reference image 232. For example, the patch 532 may include representative colors, color matching, lines, profiles, and the like in a region of the reference image 232. Accordingly, the patch 532 may be referred to as a texton.

It would be appreciated that FIG. 5 only illustrates the principle of a certain channel combination of the convolution filters. In the operating process, the used texture style sub-network will combine other channels of the convolution filters to represent other textons of the reference image 232, thereby implementing the stylization processing for all the regions of the feature maps 204.

The inventors noted that the image stylization and texture synthesis in the image processing are similar to a certain extent, both of which involve changes of the image texture. The texture synthesis involves simply using textons to process pixel values of a source image. Specifically, in the process of texture synthesis, pixel values of a corresponding patch of the source image are replaced by pixel values of a texton, and a smooth transition is enabled between the edge pixel values of the patch and pixel values of other patches in the source image. The process of texture synthesis only includes processing on pixels of the source image (replacement or smooth transition), and thus does not involve the feature information (that is, the feature maps) of the source image in the feature space. Nonetheless, in the process of image stylization, in order to enable a capability of the learning network for applying a specific texture style to different source images, the source image is transferred into the feature space. From the above processes, it can be seen that, even though the texture style is applied to the feature maps of the source image in the feature space, the texture style can be maintained in the final transformed output image. It is based on such concept that a learning network (for example, the learning network 200 as described above referring to FIGS. 2 to 4) is provided in implementations of the subject matter described herein, which explicitly divides the tasks of feature extraction and stylization processing and thus achieve a number of advantages in the processes of training and operations.

Model-Based Image Stylization

Figure 6:
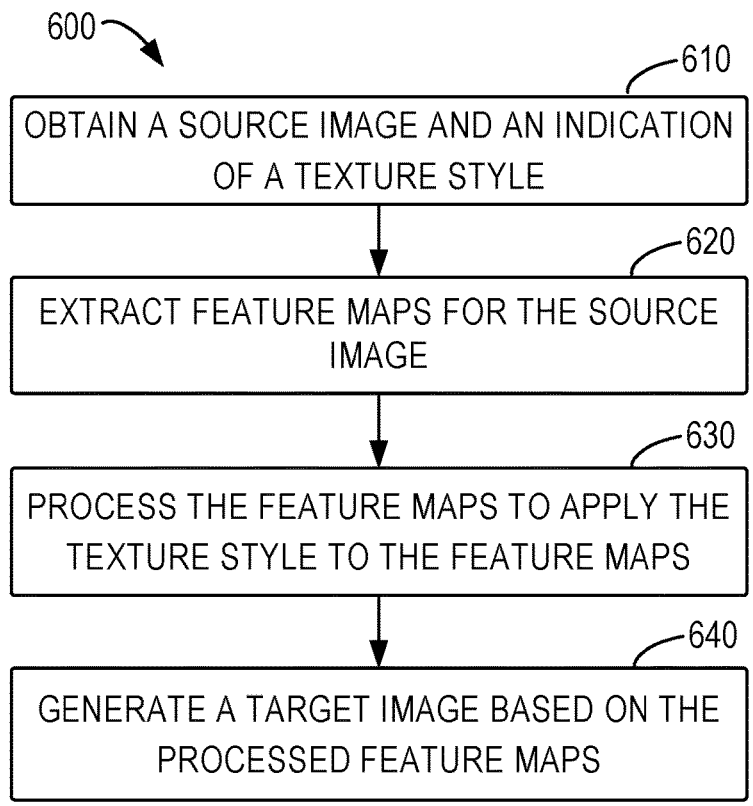
FIG. 6 illustrates a flowchart of a process for image stylization in accordance with an implementation of the subject matter described herein.

The trained learning network 200 may be stored in the image processing device 100 as, for example, a program 122 in the memory 120. The learning network 200 may also be stored externally to the image processing device 100 and accessible by the communication unit 140. Based on the learning network 200, the stylization process may be performed for a new source image. FIG. 6 illustrates a process for image stylization 600 in accordance with an implementation of the subject matter described herein. The process 600 may be performed by the computing device 110.

At 610, the image processing device 100 obtains a source image and an indication of a texture style. The source image may be an image a style of which a user wants to change, and may be received as input of the feature extraction part 210 of the learning network 200 via the input device 150 of the image processing device 100 in FIG. 1. If the image stylization part 220 of the learning network 200 includes a plurality of texture style sub-networks, during operation, an indication of one of the texture style sub-networks may be received. Of course, if the image stylization part 220 only includes one texture style sub-network, it is default that the indication indicates the texture style of that sub-network.

The indication of the texture style may also be input by the user via the input device 150. For example, indications of the texture styles supported the learning network 200 (for example reference images with the corresponding texture styles) may be provided and an indication of one of the texture styles is received via user selection. Based on the received indication, the image processing device 100 may instruct the corresponding texture style sub-network of the image stylization part 220 to perform the image stylization.

At 620, the image processing device 100 extracts feature maps for the source image with the feature extraction part 210 of the learning network 200. Each of the extracted feature maps may indicate part of feature information of the source image. In some examples, depending on the configuration of the feature extraction part 210, a plurality of feature maps may be extracted. At 630, the image processing device 100 processes the extracted feature maps with a texture style sub-network corresponding to the indicated texture style in the image style processing part 220 of the learning network 200. In the texture style sub-network consisting of the convolution filters, the convolution filters are used to perform convolution on the feature maps, and thereby applying the corresponding texture style to the feature maps. At 640, the image processing device 100 generates a target image based on the processed feature maps with the feature transform part 212 of the learning network. The feature transform part 212 performs an operation reverse to that of the feature extraction part 210, so as to implement transformation from the feature space to the image content space. As the texture style is applied to the feature maps, the transformed target image can also have the texture style.

Figure 7:
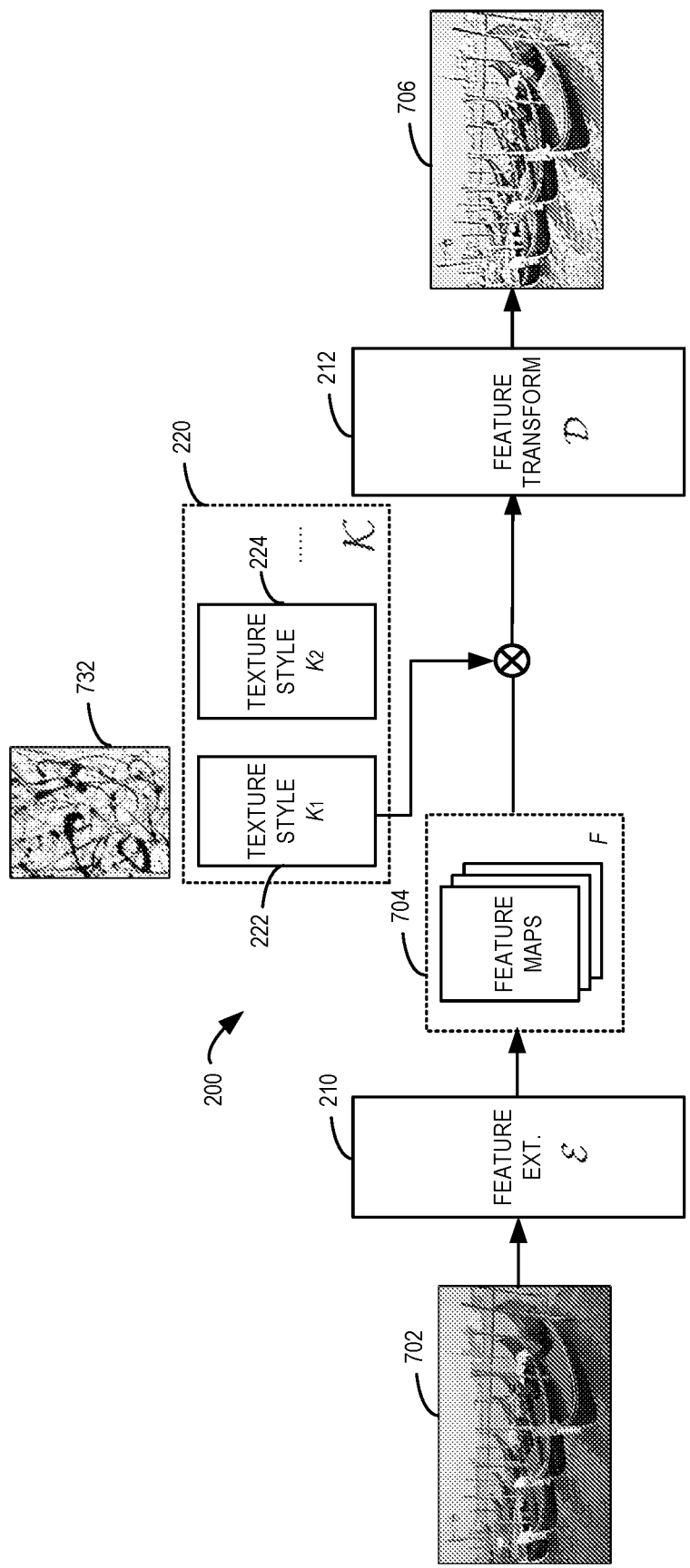
FIG. 7 illustrates a schematic diagram of image stylization based on a learning network according to an implementation of the subject matter described herein.

FIG. 7 illustrates an example of using the learning network 200. In the example shown in FIG. 7, the source image 702 is obtained as an input of the feature extraction part 210.

Since it is determined by the received indication that the reference image 732 with the texture style corresponding to the texture style sub-network 222 is selected by the user, the texture style sub-network 222 performs the image stylization. Upon receiving the input image 702, the feature extraction part 210 extracts one or more feature maps 704 from the input image 702. The convolution is performed by the texture style sub-network 222 on the feature maps 704, and the processed feature maps are provided to the feature transform part 212. The feature transform part 212 maps the feature maps into the content space to generate the target image 706. The target image 706 is a stylized image, which has a texture style similar to that of the reference image 632 used for training the texture style sub-network 222. In some examples, the target image 706 may be output via the output device 160 of the image processing device 100 to be presented to the user, for example.

In some implementations, since different texture style sub-networks of the image stylization part 220 in the learning network 200 share the same feature extraction part 210, for the same source image, different texture style sub-networks perform the stylization processing on the same feature maps. In some cases, the user may desire to try different texture styles for the same source image. In order to save computing resources and time, in some implementations, the image processing device 100 stores the feature maps extracted by the feature extraction part 210 from the source image to, for example, the storage device 130 or the memory 120. When receiving an indication of another texture style, the image processing device 100 may directly process the stored feature maps using the texture style sub-network corresponding to the other texture style, without repeating the feature extraction on the same source image by the feature extraction part 210.

In some implementations, as the stylization processes of the texture style sub-networks are separate, two or more sub-networks may be used to perform the stylization on the input source image, such that a stylization effect different from the one using a single one of the sub-networks can be achieved. Specifically, an indication of a plurality of texture styles (two or more texture styles) may be obtained. Such indication may be an indication of the stylization preconfigured by the learning network 200 or an indication defined by the user (for example, an indication received via the input device 150 of the image processing device 100). Based on this indication, the image processing device 100 may process the feature maps for the source image using the texture style sub-networks corresponding to those texture styles, thereby achieving the objective that the texture styles are fused onto these feature maps.

Figure 8:
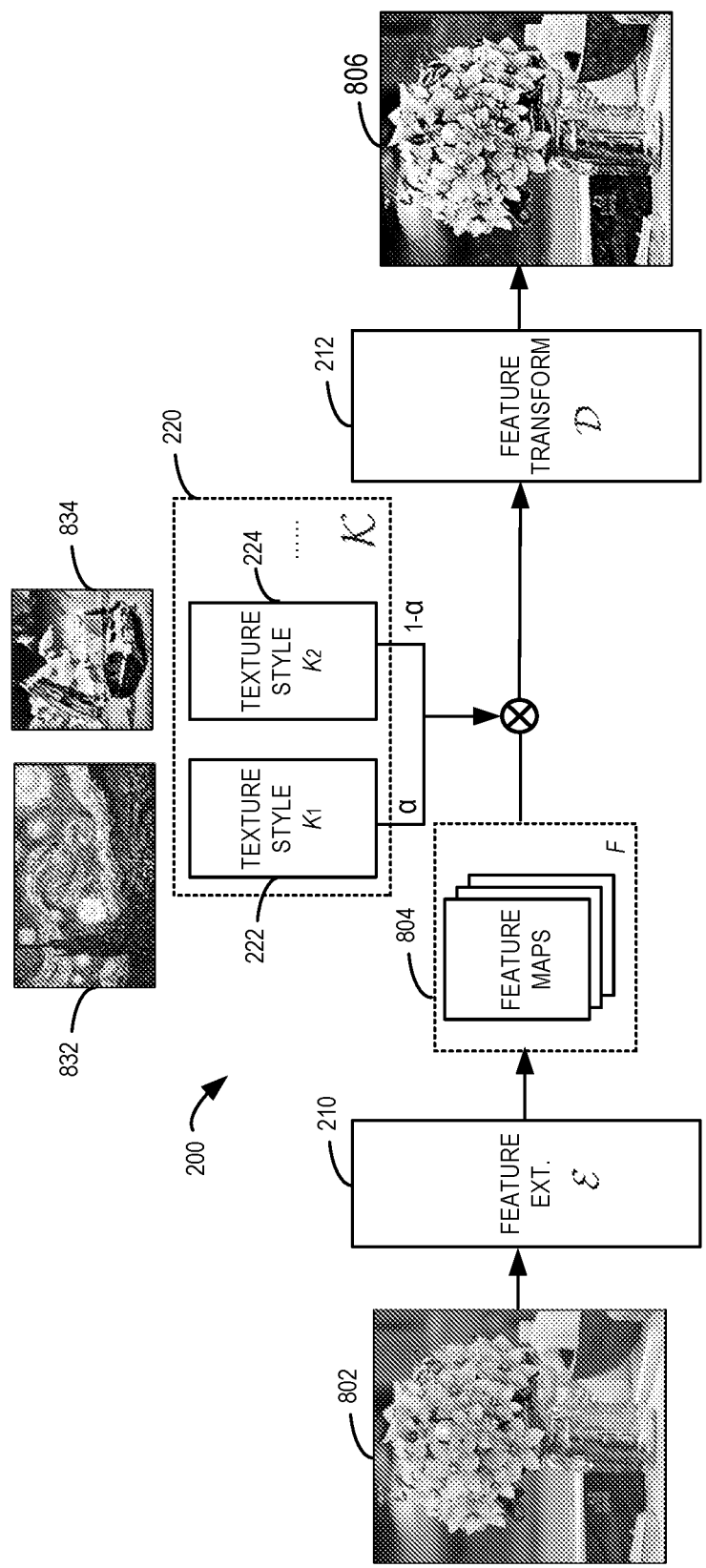
FIG. 8 illustrates a schematic diagram of image stylization based on a learning network according to another implementation of the subject matter described herein.

In some implementations, the fusion of the plurality of texture styles may be a linear fusion. That is, weights corresponding to the texture styles may be provided, and thus the corresponding texture style sub-networks perform the stylization operation based on the provided weights. FIG. 8 illustrates such an implementation. As shown, the feature extraction part 210 receives a source image 802 and extracts the feature maps 804 from the source image 802. The texture style sub-networks 222 and 224 have been trained by the reference images 832 and 834, respectively. When receiving the user selection of the two sub-networks, the image processing device 100 applies both the two texture styles to the feature maps 804. The stylization extent of the two texture styles in the feature maps 804 is controlled by the respective weights.

For example, in the example of FIG. 8, the weight for texture style corresponding to the texture style sub-network 222 is α, and the weight for the texture style corresponding to the other texture style sub-network 224 is (1−α), such that the sum of the weights is equal to 1. The two weights may be applied to the stylization of the texture style sub-networks 222 and 224. There are various methods for controlling processing of different texture style sub-networks by the weights. In an example, the respective weights may be applied to the internal processing of the texture style sub-networks 222 and 224, and the feature maps output by the two sub-networks are summed up to obtain the feature maps input to the feature transform part 212. This example may be represented as follows:

$$\tilde{F}=(\Sigma_{i=1}^{m} w_i * K_i) \otimes F \quad (4)$$

where F represents the feature maps of the source image, $\tilde{F}$ represents the processed feature maps, $w_i$ represents the weight for controlling the texture style sub-network $K_i$, m is the number of the texture styles to be fused (which is equal to 2 in the example of FIG. 8), and $\Sigma_{i=1}^{m} w_i = 1$.

Above described is only one example of texture style fusion based on the weights. There are other methods to be used to apply all the plurality of texture styles to the feature maps 804 of the source image. For example, the plurality of texture style sub-networks may be used to process the feature maps 804, respectively, and the processed feature maps are then weighted based on the respective weights to obtain the final feature maps. These feature maps are subsequently input into the feature transform part 212.

Since the two texture styles are both applied to the feature maps 804 of the source image 802, the target image 806 generated by the feature transform part 212 may display a fusion result of the two styles, which is not exactly identical to the styles of the texture style sub-networks. Through the linear fusion of the texture styles, more stylization processing may be provided to the user based on the texture styles of the trained learning network 200. In some examples, the respective weights for the texture style sub-networks may be controlled by the user. For example, the user may continuously adjust the weight for each texture style to cause the target image 806 to present different texture styles. Although two texture style sub-networks are selected for style fusion as illustrated in FIG. 8, in other examples, more texture style sub-networks in the image stylization part 220 may be preconfigured or indicated by the user with corresponding weights, if possible.

Figure 9:
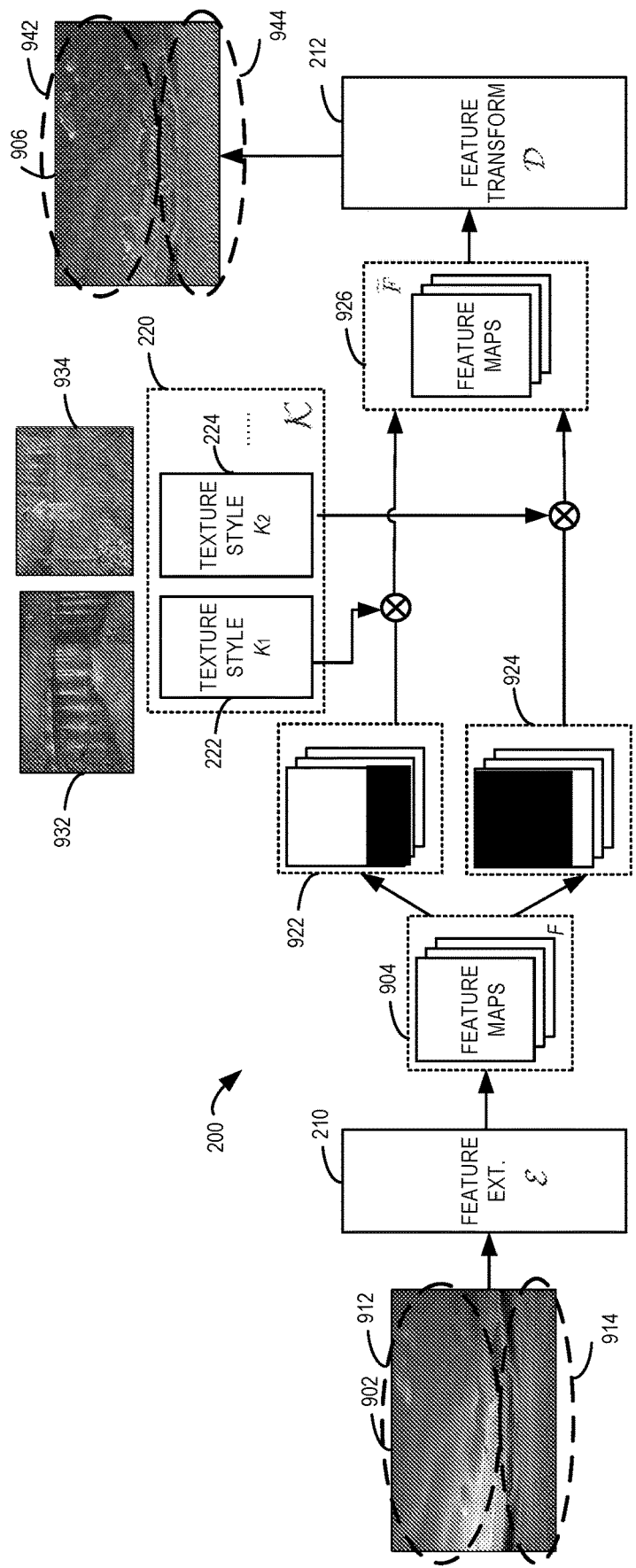
FIG. 9 illustrates a schematic diagram of image stylization based on a learning network according to a further implementation of the subject matter described herein.

In addition to the fusion of a plurality of texture styles onto the whole image or as an alternative, in some other implementations, different texture styles may be applied to different regions of the image. Specifically, different regions of the image are stylized by applying different texture styles to different regions of the feature map. FIG. 9 illustrates such an example of stylization. As illustrated, the feature extraction part 210 receives a source image 902 and extracts feature maps 904 from the source image 902. The texture style sub-networks 222 and 224 have been trained by the reference images 932 and 934, respectively. When receiving the user selection of the two sub-networks, the image processing device 100 uses the two texture style sub-networks to process different regions of the feature maps 904, respectively.

The different regions of the feature maps 904 are identified by clustering the feature maps 904. For example, the feature maps 904 may be clustered using a K-means clustering or other high-level clustering algorithm to determine the regions in the feature maps 904 that correspond to different regions 904 of the source image. Different regions may be divided into two sets which are stylized respectively by the different texture style sub-networks 222 and 224. In some other examples, the user is able to specify which texture style is applied to which regions of the source image 902, and accordingly, the corresponding texture style sub-network may be used to process the regions of the feature maps 904.

After identifying the different regions of the feature maps 904, during the process of each sub-network from the plurality of texture style sub-networks 222 and 224 performing the texture stylization, the region where the feature maps are not be processed by this sub-network may be masked, such that the texture style of the sub-network is only applied to an unmasked region. The process may be represented as follows:

$$\tilde{F}=\Sigma_{i=1}^{m} K_i \otimes (M_i \times F) \quad (5)$$

where F represents the feature maps of the source image, $\tilde{F}$ represents the processed feature maps, $M_i$ is a mask map for the texture style sub-network $K_i$ used to mask the region(s) where the stylization is not needed, and m is the number of the indicated texture styles (which is equal to 2 in FIG. 9).

In the example of FIG. 9, by clustering or user indication, it may be determined that the texture style sub-network 222 is used to stylize the region 912 of the source image 902, and thus the feature maps 904 may be masked to obtain the masked feature maps 922. The texture style sub-network 222 then applies the corresponding texture style to the feature maps 922. As some regions are masked, the texture style is only applied to the unmasked regions. The texture style sub-network 224 may be used to similarly stylize the region 914 of the source image 902 and apply the corresponding texture style to the masked feature maps 924. The feature maps processed by the texture style sub-networks 222 and 224 are summed up to obtain the final feature maps 926. Different regions of the feature maps 926 presents different texture styles provided by the texture style sub-networks 222 and 224.

After being processed, the feature maps 926 are provided to the feature transform part 212 to generate a target image 906. Since the feature maps are provided with different texture styles, a partial region 942 of the target image 906 has a texture style close to the texture style of the reference image 932, and the other partial region 944 has a texture style close to the texture style of the reference image 934.

Although FIG. 9 illustrates that two texture styles are applied to different regions of the feature maps 904, in other examples, the texture styles corresponding to three or more texture sub-networks may be similarly applied to different regions of the feature maps for the source image, if possible. In some other implementations, the texture style fusion as shown in FIG. 8 and the regional stylization as shown in FIG. 9 may be used jointly. For example, different texture styles may be fused in one region of the feature maps for the source image. The implementations of the subject matter described herein are not limited in this regard.

It would be appreciated that, for the purpose of illustration, although the reference images as shown in FIGS. 7 to 9 are different from the reference image as shown in FIG. 2, it would not affect the understanding on the training and the operation process of the learning network 200. It would also be appreciated that the source images, the reference images, and the target images as shown in FIGS. 7 to 9 are only for illustration. In the operation process of the learning network, any image may be input, including the images used for training the learning network 200. Moreover, one or more trained texture style sub-networks may be selected to stylize the source image.

Example Implementations

Some example implementations of the subject matter described herein are listed below.

In one aspect, a device is provided in the subject matter described herein. The device comprises a processing unit; and a memory coupled to the processing unit and including instructions stored thereon. The instructions, when executed by the processing unit, cause the device to perform acts including: obtaining a source image and an indication of a first texture style; extracting feature maps for the source image with a first part of a first sub-network in a learning network, each of the feature maps indicating part of feature information of the source image; processing the feature maps with a second sub-network corresponding to the first texture style in the learning network to apply the first texture style to the feature maps; and generating, based on the processed feature maps, a target image with a second part of the first sub-network.

In some implementations, processing the feature maps with the second sub-network further comprises: obtaining an indication of a second texture style; and processing the feature maps with the second sub-network and a third sub-network corresponding to the second texture style in the learning network to apply the first and second texture styles to the feature maps.

In some implementations, processing the feature maps with the second and third sub-networks comprises: processing the feature maps with the second and third sub-networks based on a first weight corresponding to the first texture style and a second weight corresponding to the second texture style to apply both the first and second texture styles to the feature maps.

In some implementations, processing the feature maps with the second and third sub-networks comprises: processing a first region of the feature maps with the second sub-network to apply the first texture style to the first region; and processing a second region of the feature maps with the third sub-network to apply the second texture style to the second region.

In some implementations, the acts further include: storing the feature maps for the source image; obtaining an indication of a third texture style; processing the stored feature maps with a fourth sub-network corresponding to the third texture style in the learning network to apply the third texture style to the feature maps; and generating a further target image based on the processed feature maps with the second part of the first sub-network.

In some implementations, the second sub-network includes a convolution filter, and processing the feature maps with the second sub-network comprises: perform convolution on the feature maps with the convolution filter to apply the first texture style to the feature maps.

In some implementations, obtaining a source image and an indication of a first texture style comprises: obtaining the source image and the indication of the first texture style via user selection.

In another aspect, a device is provided in the subject matter described herein. The device comprises a processing unit; and a memory coupled to the processing unit and including instructions stored thereon. The instructions, when executed by the processing unit, cause the device to perform acts including: obtaining a plurality of source images and a first reference image with a first texture style; and updating a learning network based on the plurality of source images and the first reference image, the learning network including a first sub-network and a second sub-network. The updating comprises: updating the first sub-network to extract feature maps for the plurality of source images with a first part of the first sub-network and to generate the plurality of source images from the feature maps with a second part of the first sub-network, each of the feature maps indicating part of feature information of a respective source image, and updating the second sub-network to apply the first texture style to the feature maps for the plurality of source images with the second sub-network.

In some implementations, the learning network further comprises a third network, the acts further comprising: obtaining a second reference image with a second texture style; and updating the third sub-network to apply the second texture style to the feature maps of the plurality of source images with the third sub-network.

In some implementations, updating the third sub-network comprises: updating the third sub-network with parameters of the first and second sub-networks fixed.

In some implementations, updating the learning network comprises: updating the second sub-network for a predetermined number of times; and updating the first sub-network after updating the second sub-network for the predetermined number of times.

In some implementations, updating the second sub-network for a predetermined number of times comprises: jointly updating the second sub-network and the first sub-network for the predetermined number of times.

In some implementations, updating the second sub-network comprises: updating the second sub-network to combine a first patch of the first reference image with a second patch in feature maps for a respective source image of the plurality of source images using the second sub-network, the first patch partially representing the first texture style.

In some implementations, the second sub-network includes a convolution filter, and updating the second sub-network comprises: updating a coefficient of the convolution filter to apply the first texture style to the feature maps by perform convolution on the feature maps with the convolution filter.

In a further aspect, a computer-implemented method is provided in the subject matter described herein. The method comprises: obtaining a source image and an indication of a first texture style; extracting feature maps for the source image with a first part of a first sub-network in a learning network, each of the feature maps indicating part of feature information of the source image; processing the feature maps with a second sub-network corresponding to the first texture style in the learning network to apply the first texture style to the feature maps; and generating, based on the processed feature maps, a target image with a second part of the first sub-network.

In some implementations, processing the feature maps with the second sub-network further comprises: obtaining an indication of a second texture style; and processing the feature maps with the second sub-network and a third sub-network corresponding to the second texture style in the learning network to apply the first and second texture styles to the feature maps.

In some implementations, processing the feature maps with the second and third sub-networks comprises: processing the feature maps with the second and third sub-networks based on a first weight corresponding to the first texture style and a second weight corresponding to the second texture style to apply both the first and second texture styles to the feature maps.

In some implementations, processing the feature maps with the second and third sub-networks comprises: processing a first region of the feature maps with the second sub-network to apply the first texture style to the first region; and processing a second region of the feature maps with the third sub-network to apply the second texture style to the second region.

In some implementations, the method further comprises: storing the feature maps for the source image; obtaining an indication of a third texture style; processing the stored feature maps with a fourth sub-network corresponding to the third texture style in the learning network to apply the third texture style to the feature maps; and generating a further target image based on the processed feature maps with the second part of the first sub-network.

In some implementations, the second sub-network includes a convolution filter, and processing the feature maps with the second sub-network comprises: perform convolution on the feature maps with the convolution filter to apply the first texture style to the feature maps.

In a further aspect, a computer-implemented method is provided in the subject matter described herein. The method comprises: obtaining a plurality of source images and a first reference image with a first texture style; and updating a learning network based on the plurality of source images and the first reference image, the learning network including a first sub-network and a second sub-network. The updating comprises: updating the first sub-network to extract feature maps for the plurality of source images with a first part of the first sub-network and to generate the plurality of source images from the feature maps with a second part of the first sub-network, each of the feature maps indicating part of feature information of a respective source image, and updating the second sub-network to apply the first texture style to the feature maps for the plurality of source images with the second sub-network.

In some implementations, the learning network further comprises a third network. The method further comprises: obtaining a second reference image with a second texture style; and updating the third sub-network to apply the second texture style to the feature maps of the plurality of source images with the third sub-network.

In some implementations, updating the third sub-network comprises: updating the third sub-network with parameters of the first and second sub-networks fixed.

In some implementations, updating the learning network comprises: updating the second sub-network for a predetermined number of times; and updating the first sub-network after updating the second sub-network for the predetermined number of times.

In some implementations, updating the second sub-network for a predetermined number of times comprises: jointly updating the second sub-network and the first sub-network for the predetermined number of times.

In some implementations, updating the second sub-network comprises: updating the second sub-network to combine a first patch of the first reference image with a second patch in feature maps for a respective source image of the plurality of source images using the second sub-network, the first patch partially representing the first texture style.

In some implementations, the second sub-network includes a convolution filter, and updating the second sub-network comprises: updating a coefficient of the convolution filter to apply the first texture style to the feature maps by perform convolution on the feature maps with the convolution filter.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A device, comprising:
a processing unit; and
a memory coupled to the processing unit and including instructions stored thereon, the instructions, when executed by the processing unit, causing the device to perform acts including:
obtaining a source image and an indication of a first texture style;
extracting a feature map for the source image with a first part of a first sub-network in a learning network, the feature map indicating part of feature information of the source image;
processing the feature map with a second sub-network corresponding to the first texture style in the learning network to apply the first texture style to the feature map; and
generating, based on the processed feature map, a target image with a second part of the first sub-network.

2. The device according to claim 1, wherein processing the feature map with the second sub-network further comprises:
obtaining an indication of a second texture style; and
processing the feature map with the second sub-network and a third sub-network corresponding to the second texture style in the learning network to apply the first and second texture styles to the feature map.

3. The device according to claim 2, wherein processing the feature map with the second and third sub-networks comprises:
processing the feature map with the second and third sub-networks based on a first weight corresponding to the first texture style and a second weight corresponding to the second texture style to apply both the first and second texture styles to the feature map.

4. The device according to claim 2, wherein processing the feature map with the second and third sub-networks comprises:
processing a first region of the feature map with the second sub-network to apply the first texture style to the first region; and
processing a second region of the feature map with the third sub-network to apply the second texture style to the second region.

5. The device according to claim 1, wherein the acts further include:
storing the feature map for the source image;
obtaining an indication of a third texture style;
processing the stored feature map with a fourth sub-network corresponding to the third texture style in the learning network to apply the third texture style to the feature map; and
generating a further target image based on the processed feature map with the second part of the first sub-network.

6. The device according to claim 1, wherein the second sub-network includes a convolution filter and processing the feature map with the second sub-network comprises:
performing convolution on the feature map with the convolution filter to apply the first texture style to the feature map.

7. The device according to claim 1, wherein obtaining a source image and an indication of a first texture style comprises:
obtaining the source image and the indication of the first texture style via user selection.

8. A device comprising:
a processing unit;
a memory coupled to the processing unit and including instructions stored thereon, the instructions, when executed by the processing unit, causing the device to perform acts including:
obtaining a source image and a first reference image with a first texture style; and updating a learning network based on the source image and the first reference image, the learning network including a first sub-network and a second sub-network, the updating comprising:
- updating the first sub-network to extract a feature map for the source image with a first part of the first sub-network, the feature map indicating part of feature information of the source image, and
- updating the second sub-network to apply the first texture style to the feature map for the source image with the second sub-network; and
- generating a target image from the feature map with a second part of the first sub-network.

9. The device according to claim 8, wherein the learning network further comprises a third sub-network, the acts further comprising:
- obtaining a second reference image with a second texture style; and
- updating the third sub-network to apply the second texture style to the feature map of the source image with the third sub-network.

10. The device according to claim 9, wherein updating the third sub-network comprises:
- updating the third sub-network with a parameter of the first and second sub-networks fixed.

11. The device according to claim 8, wherein updating the learning network comprises:
- updating the second sub-network for a number of times; and
- updating the first sub-network after updating the second sub-network for the number of times.

12. The device according to claim 11, wherein updating the second sub-network for a number of times comprises:
- jointly updating the second sub-network and the first sub-network for the number of times.

13. The device according to claim 8, wherein the second sub-network includes a convolution filter, and updating the second sub-network comprises:
- updating a coefficient of the convolution filter to apply the first texture style to the feature map by performing convolution on the feature map with the convolution filter.

14. A computer-implemented method, comprising:
- obtaining a source image and an indication of a first texture style; extracting a feature map for the source image with a first part of a first sub-network in a learning network, the feature map indicating part of feature information of the source image;
- processing the feature map with a second sub-network corresponding to the first texture style in the learning network to apply the first texture style to the feature map; and
- generating, based on the processed feature map, a target image with a second part of the first sub-network.

15. The method according to claim 14, wherein processing the feature map with the second sub-network further comprises:
- obtaining an indication of a second texture style; and
- processing the feature map with the second sub-network and a third sub-network corresponding to the second texture style in the learning network to apply the first and second texture styles to the feature map.

16. The method according to claim 15, wherein processing the feature map with the second sub-network further comprises:
- processing the feature map with the second and third sub-networks based on a first weight corresponding to the first texture style and a second weight corresponding to the second texture style to apply both the first and second texture styles to the feature map.

17. The method according to claim 15, wherein processing the feature map with the second sub-network further comprises:
- processing a first region of the feature map with the second sub-network to apply the first texture style to the first region; and
- processing a second region of the feature map with the third sub-network to apply the second texture style to the second region.

18. The method according to claim 15, further comprising:
- storing the feature map for the source image;
- obtaining an indication of a third texture style;
- processing the stored feature map with a fourth sub-network corresponding to the third texture style in the learning network to apply the third texture style to the feature map; and
- generating a further target image based on the processed feature map with the second part of the first sub-network.

19. The method according to claim 14, wherein processing the feature map with the second sub-network further comprises: performing convolution on the feature map with a convolution filter to apply the first texture style to the feature map.

20. The method according to claim 14, wherein processing the feature map with the second sub-network further comprises:
- obtaining the source image and the indication of the first texture style via user selection.

* * * * *